March 9, 1926. 1,575,999
L. L. MACK
FLUID BRAKE FOR AUTOMOBILES
Filed Dec. 15, 1923  2 Sheets-Sheet 2
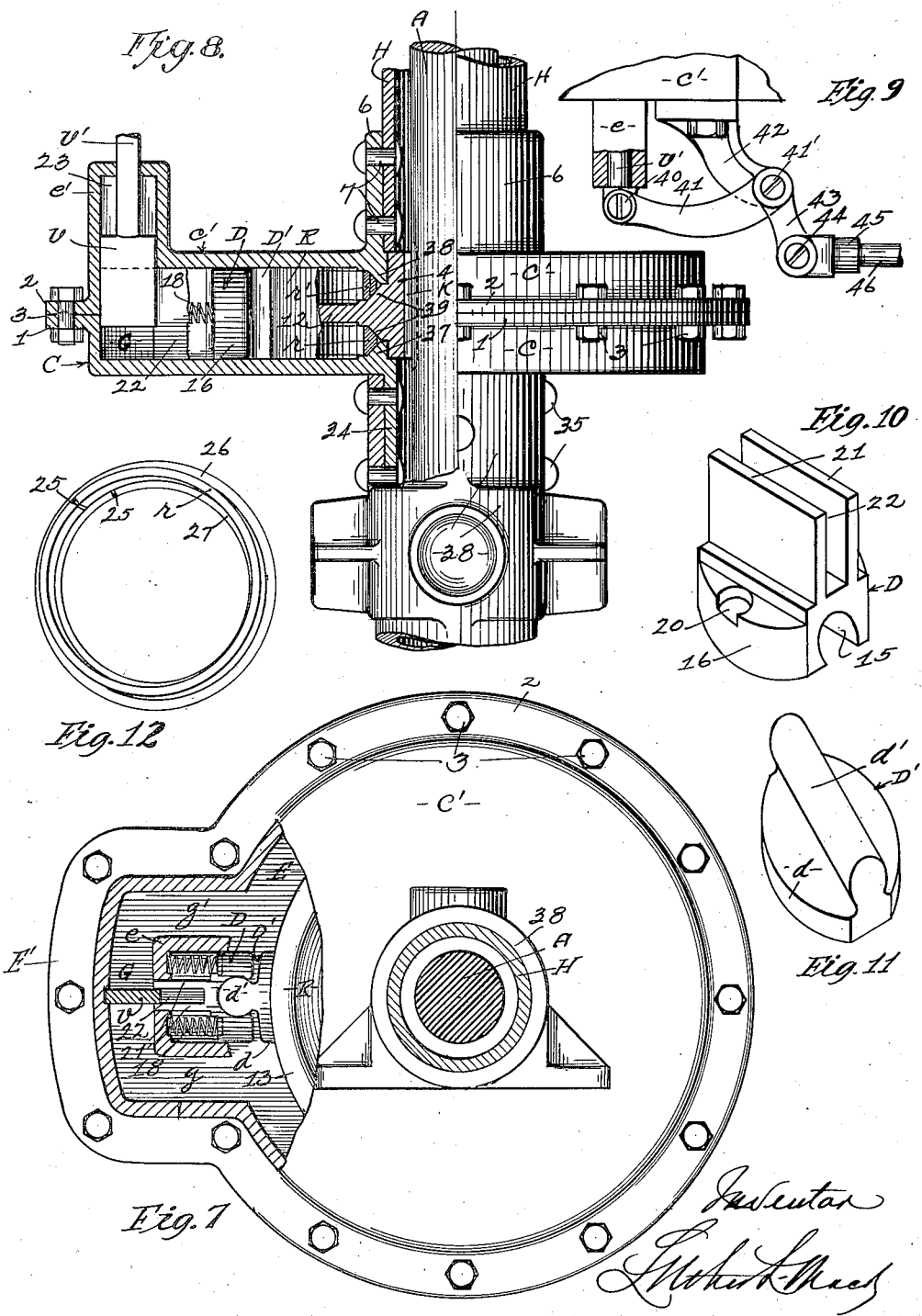

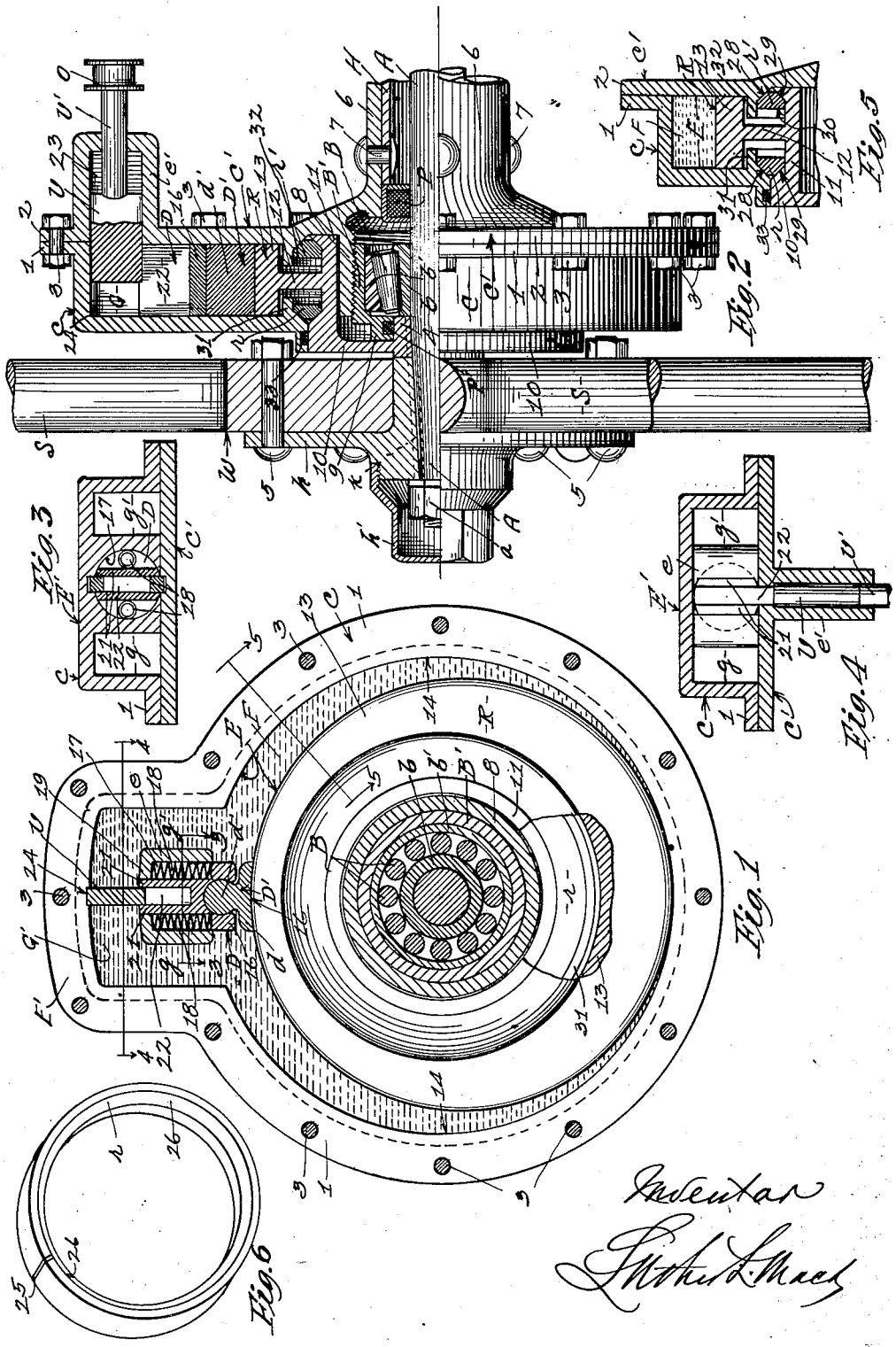

Patented Mar. 9, 1926.

1,575,999

UNITED STATES PATENT OFFICE.

LUTHER L. MACK, OF SOUTH PASADENA, CALIFORNIA.

FLUID BRAKE FOR AUTOMOBILES.

Application filed December 15, 1923. Serial No. 680,883.

*To all whom it may concern:*

Be it known that I, LUTHER L. MACK, a citizen of the United States, and a resident of South Pasadena, in the county of Los Angeles and State of California, have invented new and useful Improvements in Fluid Brakes for Automobiles, of which the following is a specification.

This invention relates to and has for a main object the provision of an improved fluid brake mechanism particularly adapted for use for motor propelled vehicles, but applicable to other power mechanisms whereby the operation of a driven shaft may be retarded or completely stopped by restricting the passage of the fluid.

Another object is to provide a fluid brake mechanism embodying relatively stationary and rotatable members, one of said members being enclosed within the other and arranged to provide a fluid chamber wholly or partially surrounding the inner member for the reception of the fluid, together with a movable abutment carried by the stationary member and engaging the rotatable member for diverting the passage of the fluid during the operation of the mechanism from a circular path and through a by-pass, means being provided in the by-pass and co-operating with said abutment for restricting the area of the by-pass, thereby restricting the passage of the fluid and creating pressure within the outer member for retarding or stopping the rotation of the rotatable member.

Another object is to provide a fluid brake mechanism embodying relatively stationary and rotatable members arranged one within the other, providing a fluid chamber of irregular or varying area at different points, together with an abutment closing said chamber at a single point and a by-pass through which the passage of the fluid is diverted around said abutment, and means for varying the opening in said by-pass to correspond to the effective area of the fluid chamber at different periods in the operation of the mechanism, together with means for cutting off and restricting the effective opening of the by-pass for restricting the passage of the fluid therethrough.

Other minor and detailed objects will appear as the description progresses.

I have shown two forms of my invention in the accompanying drawings, subject to modification within the scope of the appended claims, in which:

Fig. 1 is a sectional elevation of one form of device in a plane transverse to the axis of a driven shaft.

Fig. 2 is a side elevation of the same, with the upper half thereof in section.

Fig. 3 is a section of the same on line 3—3 of Fig. 1.

Fig. 4 is a section of the same on line 4—4 of Fig. 1.

Fig. 5 is a section of the same on line 5—5 of Fig. 1.

Fig. 6 is a perspective view of a pressure sealing ring adapted for use in connection with the form of device shown in Figs. 7 and 8.

Fig. 7 is an elevation of a modified form of device partly in section.

Fig. 8 is a side elevation of the same, partly in section.

Fig. 9 is a fragmentary top plan view, showing the operating means therefor.

Fig. 10 is a perspective view of the abutment employed in both forms of device.

Fig. 11 is a perspective view of the abutment shoe; and

Fig. 12 is a perspective view of a pressure sealing ring adapted for use in connection with the form of device shown in Figs. 1 and 2.

Referring now particularly to the form of device shown in Figs. 1 to 5 inclusive, I have shown my improved fluid brake mechanism applied to the rear axle A of a motor vehicle on the inner side of the wheel W, in lieu of the usual friction brake mechanism adapted to said wheel.

As shown in the drawings my improved mechanism includes a pair of mating casing members C and C' provided respectively, with flanges 1 and 2 and held together by means of a plurality of bolts 3, 3, etc., extended through said flanges. Within the housing formed by members C and C' I provide a rotor R which has a hub 4 adapted to be fixed to the axle A by means of a key K which also serves to rotatably connect the axle with the hub $h$ of a wheel W. The hub $h$ is usually attached to the spokes S, S, by means of bolts 5, 5, etc., and the outer end of axle A has a retaining nut $a$ held within the hub cap $h'$ carried on hub $h$, though this is immaterial to my invention.

Casing member C' has an inwardly extended hub 6 which is riveted to the axle housing H by means of a plurality of rivets 7, 7, etc., and the inner end of said hub carries a packing ring P abutting the end of the axle housing H for sealing the housing against the leakage of oil therefrom.

The axle A is usually provided with a roller bearing B composed of a plurality of rollers mounted between cones $b$ and $b'$, the cone $b$ being fixed to the axle A. In the present invention, this bearing is mounted between the hub 4 of rotor R and the packing ring P. The outer cone $b'$ is held within a retaining and adjusting ring B' which is threaded into an internal hub 8 of member C'.

Member B' has a reduced portion 9 with a packing ring P' encompassing the hub 4 of rotor R. Rotor R has a web portion 10 connecting the hub 4 thereof with an annular portion 11 which surrounds the internal hub 8 of casing C', as shown in Fig. 2, and the portion 11 of the rotor is connected by means of a central web 12 with a rim 13 which is eccentric to the axis of axle A. The casing member C, however, has a bore 14 which is concentric to the axis of axle A so that a crescent shaped fluid chamber E is provided around the periphery of the rim 13 of said rotor in the form of device shown.

In this connection it will be noted that due to the eccentricity of the rotor R within the bore 14, the cross sectional area of the fluid chamber E varies at different points around the periphery of the rotor, and that when said rotor is rotating within the casing members C and C' the position of the fluid chamber E will be constantly changing. For instance, when the rotor is in the position shown in Fig. 1, the area of the chamber E at a point adjacent cutting the vertical axial line thereof, will be at a maximum, while a diametrically opposite point on said axial line will be at a minimum.

At a single point on the periphery of the rotor R and on a line cutting the axis of axle A, I provide a slidable abutment D which has an oscillatable shoe D' pivotally held on the inner end thereof by means of a rib $d'$ of semi-circular cross section, which is adapted to pivotally seat in a correspondingly formed recess 15 in the lower portion 16 of the shoe D. The shoe D' has an inner portion $d$ with a concave inner surface 16 curved to conform to the periphery of the rotor R, so that as said rotor revolves the shoe D' will oscillate on the abutment D. Both the members D and D' are substantially circular in form, as shown in Figs. 10 and 11 at their lower ends, and are adapted to slide within a bore 17 formed in an extension $e$ on the interior of the casing member C.

Said extension $e$ is so formed as to provide passages $g$ and $g'$ on opposite sides thereof, which communicate at their inner ends with the chamber E and also with a by-pass G substantially concentric with the bore 14. The casing members C and C' are so formed as to provide an extension E' forming an outer wall for the passages $g$ and $g'$, and the by-pass G, as shown in Fig. 1. Thus, the chamber E is continued completely around the abutment D by means of the passage $g$, and by-pass G and the passage $g'$ in the order named, as the rotor rotates in a clockwise direction.

The abutment D is resiliently held in contact with the rotor R by means of one or more springs as at 18, which are adapted to compress between the portions 16 of member D and the inner side of the wall 19 of extension $e$. The portion 16 of member D may be recessed at 20, as shown in Fig. 10, for receiving the lower ends of the springs 18.

The upper portion of member D is composed of a pair of parallel ribs 21, 21 providing a channel 22 therebetween, said ribs being disposed transversely of the fluid chamber E so that the ends of the ribs and also the ends of the portion 16 of member D will snugly fit the inner sides of the members C and C'.

Portions 21, 21 of member D are slidable through an opening in the partition 19 of the extension $e$, as shown in Fig. 1, and member C' has an outwardly extended portion $e'$ of rectangular cross section, as shown in Fig. 4, formed centrally of the by-pass G and adapted to receive a slide valve V corresponding in area to the area of the interior 23 of the extension $e'$. The valve V slides in a groove 24 formed in the upper wall of by-pass G and also in the channel 22 formed between the ribs 21, 21 of member D.

Now, it will be observed that as the rotor revolves the point on the periphery of the rotor which has the greatest radius will contact with the periphery of the bore 14, so as to seal the chamber E at successive points during the rotation thereof, and this rotation of member R serves to retract the members D and D' from the bore 14 until the point of greatest radius on member R registers with the radially disposed center line of said members D and D'. When members D and D' are thus retracted the springs 18, 18 are compressed and the ribs 21, 21 are extended into the by-pass G, proportionate to the extent of retraction of members D and D' from the fluid chamber E. That is to say, the cross sectional area of the by-pass G being substantially, if not exactly, equal to the maximum cross sectional area of the chamber E, when the abutment members D and D' are extended into the chamber E to a maximum extent, the by-pass G will be correspondingly opened to a maximum extent.

On the other hand, when members D and D' are completely retracted from chamber E the portions 21, 21 of member D will be extended clear across the by-pass G so as to completely close said by-pass against the passage of fluid between the passages $g$ and $g'$.

At this point it may be observed that it is necessary for the proper operation of this device that the cross sectional area of by-pass G and the maximum cross sectional area of the chamber E on the same radial line from the axis of axle A should be equal, so that during the rotation of member R the abutment members D and D', while receding from the chamber E will extend into the by-pass G and vice versa, to a corresponding extent so that the effective area of chamber E and by-pass G will be at all times proportionate, as determined by the movement of the member D.

This is true for the reason that were it otherwise arranged the effective area of chamber E is gradually changing due to the fact that the position of chamber E is gradually changing as rotor R revolves, and if by-pass G were completely open when the effective area of chamber E had become less than maximum effective area, the operation of the valve V across the by-pass G would not be effective for maintaining an even and regular retardation of stoppage of member R, for when less than a maximum effective area of chamber E exists and a maximum effective area of by-pass G is open, assuming that the valve V were partially closed, the volume of fluid delivered from chamber E through passage $g$ to by-pass G would be less in all probability or at certain times than the volume which the opening in by-pass G could accommodate without friction or loss of energy.

In order to obviate any irregularity in the retardation of member R and any loss of efficiency in the operation of the brake, the valve V is mounted so as to move in a plane at right angles to the movement of member D, and the depth of the channel 22 in member D is sufficient so that the operation of valve V will not be impaired or affected when member D is at the uppermost limit of its thrust.

Thus, it will be seen that while the effective area of by-pass G is cut off vertically by the operation of member D so as to conform to the effective area of chamber E, the operation of valve V at right angles to member D will further cut off the opening in by-pass G and regulate the effective area thereof in exact proportion, regardless of the exact position of rotor R or chamber E, and vibrational loss of energy and irregularity in the application of the brakes will be prevented.

The valve V may be connected with a suitable operating member such as the usual brake pedals of an automobile as shown in Fig. 9, as hereinafter described, or otherwise, and to this end the valve has a stem G' which may be provided with a suitable operating member O.

Now, it is necessary in the provision of fluid brakes to provide against leakage of the fluid therefrom, and for this purpose I have shown a distinctly novel and efficient arrangement. It will be understood in this connection that the volume of fluid is held solely within the chamber E, by-pass G, and passages $g$ and $g'$, and that when the valve V is completely open and the vehicle is in operation, the centrifugal force set up by the rotation of member R within the casing C will serve to retain the fluid externally of the periphery of member R as the same is circulated through chamber E, by-pass G and passages $g$ and $g'$, and pressure within the casings C and C' only exists when the valve V is partially or wholly closed, the amount of pressure depending upon the extent of operation of valve V.

I accomplish the effective sealing of the casing C against leakage by means of a pair of metallic rings $r$ and $r'$ of the character shown in Fig. 12. Said rings are of annular form and may be split with overlapping joints as at 25, 25, in Fig. 12, and provided with correspondingly beveled faces 26 and 27 which are adapted to engage correspondingly beveled seats 28, 28 formed on the interior of members C and C', and 29, 29 formed on the annular portion 11 of the rotor R. The inner sides 30 of said rings are flat and the rings are held within annular recesses formed between annular projections 31 and 32 on casing members C and C' respectively, and the outer surface of the portion 11 of the rotor. Thus, the inner faces 30, 30 of the rings $r$ and $r'$ present a surface of substantial area whereby when pressure is created in the chamber E by the operation of the valve V, the pressure therein will serve to firmly seat the rings over the joints between the casing and the rotor.

Member C may be additionally provided with a packing ring 33 which surrounds the web portion 10 of the rotor so as to prevent the leakage of oil when no pressure exists in the chamber E.

Now, the form of device shown in Figs. 7 and 8 is arranged for attachment to the rear axle housing H of the vehicle at a point inwardly of the springs, the casing member C' being attached by means of its web 6 and the rivets 7 to the outer end of housing H which encloses the axle A, whereas the case member C has a hub 34 which is attached by means of rivets 35 to the spring supporting member 36, which in turn will be connected at its outer end to the wheel W in the usual manner, not shown on the drawings.

In this latter form of device the internal arrangement of the rotor R is slightly different from the previously described form, inasmuch as the hub 4 of the rotor underlies beveled portions 37 and 38 of the casing members C and C' respectively, while the said hub has beveled portions 39, 39 all of which beveled portions form seats for the annular pressure sealing rings, shown in Fig. 6, substantially the equivalent of piston rings which are split and provided with overlapping joints, as shown.

In this form of device the natural tension of the rings r and r' would be sufficient to close the joints between the rotor and the casing members C and C', and additional packing around the joints would be unnecessary for the reason that the casing members C and C' are interposed in the axle housing and serve to rigidly connect outer portions thereof and any leakage which might occur would be from the casing into the interior of housing H, and the fluid would ultimately find its way to the differential housing and would not be outwardly of the casing.

As shown in Fig. 9, the valve stem V' is pivotally connected at 40 to a long arm 41 of a bell crank which is pivotally supported at 41 on a bracket 42 attached to the casing member C'. Said bell crank has a short arm 43 which may be connected at 44 with a clevis 45 and a brake operating rod 46 adapted for connection to any suitable operating member, such as the brake pedal of a vehicle.

It will be understood from the foregoing that my improved fluid brake mechanism may be utilized for other purposes than for motor vehicles, where it is desired to retard or stop a power driven shaft as at A, in Figs. 7 and 8, and I do not restrict or limit myself to the use of the mechanism shown and described herein in connection with motor vehicles.

What I claim is:

1. A fluid brake mechanism embodying a driven member, a relatively stationary member, one of said members being enclosed by the other, a fluid receiving space provided adjacent the periphery of the inner member having a width of variable dimension at different points on the periphery of the driven member, and a manually operable member movable in a plane at right angles to said variable dimensions for varying the area of a portion of said space corresponding to the successive positions of and during the rotation of the driven member.

2. A fluid brake mechanism including relatively stationary and rotatable members, one of said members being eccentric to the other and providing a fluid chamber therebetween, an abutment slidably supported in said stationary member and engaging said rotatable member, a by-pass formed in said stationary member and extending around said abutment and communicating with said chamber on opposite sides of said abutment, said abutment being extensible through said by-pass for regulating the area of the by-pass to correspond with the area of said chamber at a point adjacent said abutment, and a valve in said by-pass for restricting the opening in said by-pass adjacent said abutment.

3. A fluid brake mechanism including relatively stationary and rotatable members, one of said members being eccentric to the other and providing a fluid chamber therebetween, an abutment slidably supported in said stationary member and engaging said rotatable member, a by-pass formed in said stationary member and extending around said abutment and communicating with said chamber on opposite sides of said abutment, said abutment being extensible through said by-pass for regulating the area of the by-pass to correspond with the area of said chamber at a point adjacent said abutment, and a valve in said by-pass cooperating with said abutment for restricting the area of the by-pass and retarding the operation of said rotatable member.

4. A fluid brake mechanism including relatively stationary and rotatable members, one of said members being eccentric to the other and providing a fluid chamber therebetween, an abutment slidably supported in said stationary member and engaging said rotatable member, a by-pass formed in said stationary member and extending around said abutment and communicating with said chamber on opposite sides of said abutment, said abutment being extensible through said by-pass for regulating the area of the by-pass to correspond with the area of said chamber at a point adjacent said abutment, and a valve movably held in said by-pass for operation in a plane at right angles to the movement of said abutment for regulating the opening of said by-pass.

5. A fluid brake mechanism including relatively stationary and rotatable members, one of said members being eccentric to the other and providing a fluid chamber therebetween, an abutment slidably supported in said stationary member and engaging said rotatable member, a by-pass formed in said stationary member and extending around said abutment and communicating with said chamber an opposite sides of said abutment, said abutment being extensible through said by-pass for regulating the area of the by-pass to correspond with the area of said chamber at a point adjacent said abutment, and a valve in said by-pass and movable through said abutment for regulating the opening of said by-pass.

6. A fluid brake mechanism including a stator having a bore therein, a rotor within and eccentric to said bore, providing a fluid chamber therearound of varying area, a by-pass communicating at opposite ends and at spaced points with said chamber, the area of said by-pass being substantially equal to the maximum area of said chamber, an abutment slidably disposed in said stator and engaging said rotor at a point intermediate the ports of said by-pass, said abutment serving to vary the open area of said by-pass to an extent corresponding to the area of said chamber adjacent said abutment.

7. A fluid brake mechanism including a stator having a bore therein, a rotor within and eccentric to said bore, providing a fluid chamber therearound of varying area, a by-pass communicating at opposite ends and at spaced points with said chamber, the area of said by-pass being substantially equal to the maximum area of said chamber, an abutment slidably disposed in said stator and engaging said rotor at a point intermediate the ports of said by-pass, said abutment serving to open and close said by-pass to an extent corresponding to the space between the periphery of said rotor and said stator at a point adjacent the abutment.

8. A fluid brake mechanism including a stator having a bore therein, a rotor within and eccentric to said bore, providing a fluid chamber therearound of varying area, a by-pass communicating at opposite ends and at spaced points with said chamber, the area of said by-pass being substantially equal to the maximum area of said chamber, an abutment slidably disposed in said stator and engaging said rotor at a point intermediate the ports of said by-pass, said abutment serving to vary the open area of said by-pass to an extent corresponding to the area of said chamber adjacent said abutment, and a valve for regulating the open area of said by-pass.

9. A fluid brake mechanism including a stator having a bore therein, a rotor within and eccentric to said bore, providing a fluid chamber therearound of varying area, a by-pass communicating at opposite ends and at spaced points with said chamber, the area of said by-pass being substantially equal to the maximum area of said chamber, an abutment slidably disposed in said stator and engaging said rotor at a point intermediate the ports of said by-pass, said abutment serving to vary the open area of said by-pass to an extent corresponding to the area of said chamber adjacent said abutment, and a valve cooperating with said abutment for further regulating the open area of said by-pass.

10. A fluid brake mechanism including a stator having a bore therein, a rotor within and eccentric to said bore, providing a fluid chamber therearound of varying area, a by-pass communicating at opposite ends and at spaced points with said chamber, the area of said by-pass being substantially equal to the maximum area of said chamber, an abutment slidably disposed in said stator and engaging said rotor at a point intermediate the ports of said by-pass, said abutment serving to open and close said by-pass to an extent corresponding to the space between the periphery of said rotor and said stator at a point adjacent the abutment, and a valve for regulating the open area of said by-pass.

11. In a fluid brake having relatively eccentric stationary and rotatable members, providing a fluid chamber around said rotatable member, said chamber including a by-pass, an abutment slidably disposed in said stationary member and extensible across said chamber and said by-pass.

12. In a fluid brake having relatively eccentric stationary and rotatable members, providing a fluid chamber around said rotatable member, said chamber including a by-pass, an abutment slidably disposed in said stationary member and extensible across said chamber and said by-pass, and a valve cooperating with said abutment for regulating the passage of a fluid from one portion of said chamber to the other.

13. In a fluid brake having relatively eccentric stationary and rotatable members, providing a fluid chamber around said rotatable member, said chamber including a by-pass, an abutment slidably disposed in said stationary member and extensible across said chamber and said by-pass, and a valve cooperating with said abutment for regulating the passage of a fluid from one portion of said chamber to the other, said valve and said abutment being movable in relatively right angular planes.

14. In a fluid brake having relatively eccentric stationary and rotatable members, providing a fluid chamber around said rotatable member, said chamber including a by-pass, an abutment slidably disposed in said stationary member and extensible across said chamber and said by-pass, and a valve cooperating with said abutment for regulating the passage of a fluid from one portion of said chamber to the other, said valve and said abutment being movable in relatively right angular planes, said valve being movable through said abutment.

15. A fluid brake mechanism including a fluid chamber, a radially movable member extensible into and from said chamber, a passage communicating at spaced points with said chamber and on opposite sides of said movable member, said movable member being also extensible into and from said passage, for regulating the area of the passage to correspond to the area of said chamber.

16. A fluid brake mechanism including a fluid chamber, a radially movable member extensible into and from said chamber, a by-pass communicating at spaced points with said chamber and on opposite sides of said movable member, said movable member being also extensible into and from said by-pass for regulating the area of the passage to correspond to the area of said chamber, and a valve in said by-pass for further regulating the area of the passage.

17. A device of the character described including a pair of spaced chambers for the reception of a fluid and communicating with each other at spaced points, and a movable member arranged for extension into one of said chambers and for retraction from the other chamber at each operation thereof, whereby one of said chambers will be opened and the other closed to the passage of a fluid.

18. A device of the character described including a pair of spaced chambers for the reception of a fluid and communicating with each other at spaced points, and a movable member arranged for extension into one of said chambers and for retraction from the other chamber at each operation thereof, whereby one of said chambers will be opened and the other closed to the passage of a fluid, said movable member being disposed between the points of communication of said chambers.

19. A device of the character described including a pair of spaced chambers for the reception of a fluid and communicating with each other at spaced points, and a movable member arranged for extension into one of said chambers and for retraction from the other chamber at each operation thereof, whereby one of said chambers will be opened and the other closed to the passage of a fluid, and a valve in one of said chambers for closing the same when it is open by reason of the retraction of said movable member.

20. A device of the character described including a pair of spaced chambers for the reception of a fluid and communicating with each other at spaced points, and a movable member arranged for extension into one of said chambers and for retraction from the other chamber at each operation thereof, whereby one of said chambers will be opened and the other closed to the passage of a fluid, said movable member being disposed between the points of communication of said chambers, and a valve in one of said chambers cooperating with said movable member for further regulating the area thereof.

21. A fluid brake mechanism including a driven member, a rotor thereon, a housing surrounding said rotor and provided with a fluid chamber of greater diameter than said rotor, an abutment carried in said housing for preventing the circulation of said fluid in a circular path, a by-pass around said abutment for diverting the fluid, said abutment being extensible into said chamber and said by-pass for regulating the passage of fluid.

22. A fluid brake mechanism including a driven member, a rotor thereon, a housing surrounding said rotor and provided with a fluid chamber of greater diameter than said rotor, an abutment carried in said housing for preventing the circulation of said fluid in a circular path, a by-pass around said abutment for diverting the fluid, said abutment being extensible into said chamber and said by-pass for regulating the passage of fluid, and a valve in said by-pass for restricting the passage of the fluid.

23. A fluid brake mechanism embodying a stator, a driven shaft therein, a rotor in and eccentric to the interior of said stator and arranged for rotation with said driven shaft, said stator and said rotor having internal and oppositely beveled portions adjacent the joints therebetween, and annular rings engaging said beveled portions.

24. A fluid brake mechanism embodying a driven shaft, a stator embracing said shaft and having a bore concentric therewith, a rotor arranged for rotation with said shaft and having a peripheral portion eccentric to said bore, said stator and said rotor having similarly formed and oppositely beveled portions adjacent the joints therebetween, and rings having correspondingly beveled portions seated over said joints.

25. A fluid brake mechanism embodying a stator having a circular bore, a driven shaft therein, a rotor arranged for rotation with said shaft and enclosed by said stator, said rotor having a peripheral portion eccentric to said bore for providing a fluid chamber between said stator and said rotor, annular ring receiving portions formed on said stator and said rotor concentric with said driven shaft, and rings held therein for sealing the joints between the rotor and stator.

26. A fluid brake mechanism embodying a stator having a bore, a rotor enclosed thereby and eccentric thereto, a driven member fixed to said rotor, annular recesses formed opposite the joints between said stator and said rotor and provided with reversely beveled portions, and rings engaging said beveled portions for sealing said joints.

27. A fluid brake embodying relatively concentric and eccentric members providing a fluid chamber therebetween, annular recesses formed in said members opposite the joint therebetween, and a ring held in said recesses over said joint for sealing the joint against leakage.

28. A fluid brake embodying relatively concentric and eccentric members providing a fluid chamber therebetween, annular recesses formed in said members opposite the joint therebetween, and a split ring held in said recesses over said joint for sealing the joint against leakage.

29. A fluid brake embodying relatively concentric and eccentric members providing a fluid chamber therebetween, annular recesses formed in said members opposite the joint therebetween, and a split ring having overlapping portions at the split held in said recesses over said joint for sealing the joint against leakage.

30. A fluid brake embodying relatively concentric and eccentric members providing a fluid chamber therebetween, annular recesses formed in said members opposite the joint therebetween, and a split ring held in said recesses over said joint for sealing the joint against leakage, said recesses having beveled portions forming a seat for said ring, and said ring having corresponding beveled portions engaging the beveled portions of said recesses.

31. A brake mechanism embodying relatively concentric and eccentric members, said eccentric member being enclosed by said concentric member and having spaced walls forming a fluid receiving chamber around the periphery of said eccentric member, annular recesses formed in said members internally of said fluid receiving chamber, and an annular ring mounted in said recess and engaging said concentric and eccentric members on opposite sides of the joint therebetween for sealing said joint against leakage of the fluid, said recesses being of greater area than said ring, whereby pressure may be applied to the periphery of said ring, for the purpose described.

32. A brake mechanism embodying relatively concentric and eccentric members, said eccentric member being enclosed by said concentric member and having spaced walls forming a fluid receiving chamber around the periphery of said eccentric member, annular recesses formed in said members internally of said fluid receiving chamber, and an annular split ring mounted in said recess and engaging said concentric and eccentric members on opposite sides of the joint therebetween for sealing said joint against leakage of the fluid, said recesses being of greater area than said ring, whereby pressure may be applied to the periphery of said ring, for the purpose described.

33. A brake mechanism embodying relatively concentric and eccentric members, said eccentric member being enclosed by said concentric member and having spaced walls forming a fluid receiving chamber around the periphery of said eccentric member, annular recesses formed in said members internally of said fluid receiving chamber, and an annular split ring mounted in said recess and engaging said concentric and eccentric members on opposite sides of the joint therebetween for sealing said joint against leakage of the fluid, said recesses being of greater area than said ring whereby pressure may be applied to the periphery of said ring, opposite portions of said recess and corresponding portions of said ring being beveled, for the purpose described.

34. A fluid brake mechanism including a stator having a circular bore therein, a movable abutment carried by said stator and extensible into said bore, a driven member extended through said stator and concentric with said bore, a rotor fixed to said driven member and having a periphery eccentric to said bore and providing a fluid chamber in said stator, and a metallic packing ring closing the joint between said stator and said rotor for preventing the leakage of fluid from said chamber.

35. A fluid brake mechanism including a stator having a circular bore therein, a movable abutment carried by said stator and extensible into said bore, a driven member extended through said stator and concentric with said bore, a rotor fixed to said driven member and having a periphery eccentric to said bore and providing a fluid chamber in said stator, and a split metallic packing ring closing the joint between said stator and said rotor for preventing the leakage of fluid from said chamber.

36. A fluid brake mechanism including a stator having a circular bore therein, a movable abutment carried by said stator and extensible into said bore, a driven member extended through said stator and concentric with said bore, a rotor fixed to said driven member and having a periphery eccentric to said bore and providing a fluid chamber in said stator, and a contractable and expansible metallic packing ring closing the joint between said stator and said rotor for preventing the leakage of fluid from said chamber.

37. A fluid brake mechanism including a stator having a circular bore therein, a movable abutment carried by said stator and extensible into said bore, a driven member extended through said stator and concentric with said bore, a rotor fixed to said driven member and having a periphery eccentric to said bore and providing a fluid chamber in said stator, and an expansible and contractable metallic ring split at a single point and having overlapping portions in said split, for closing the joint between said stator and said rotor for preventing the leakage of fluid from said chamber.

38. A fluid brake mechanism embodying a stator, a rotor enclosed thereby, said rotor being of such form as to provide a fluid chamber within said stator, an abutment closing said chamber against the passage of the fluid, a by-pass around said abutment having ports open to said chamber, a valve in said by-pass for closing one of said ports against the passage of fluid, and a metallic packing ring seated over the joint between said stator and said rotor for preventing the leakage of fluid when said valve is operated for restricting the circulation thereof.

39. A fluid brake mechanism embodying a stator composed of separable members held together for retaining a fluid therein, and provided with a circular chamber, a driven member in said stator, an eccentric rotor fixed to said driven member and enclosed by said stator and providing a fluid chamber therearound, an abutment carried by said stator for engagement with the periphery of said rotor for closing said fluid chamber against the passage of fluid thereby, a by-pass having ports communicating with said chamber on opposite sides of said abutment for permitting the passage of fluid around said abutment, a valve in said by-pass for controlling the passage of the fluid, and a ring embracing the joint between said stator and said rotor for sealing the same against leakage.

40. A fluid brake mechanism embodying a stator composed of separable members held together for retaining a fluid therein and provided with a circular chamber, a driven member in said stator, an eccentric rotor fixed to said driven member and enclosed by said stator and providing a fluid chamber therearound, an abutment carried by said stator for engagement with the periphery of said rotor for closing said fluid chamber against the passage of fluid thereby, a by-pass having ports communicating with said chamber on opposite sides of said abutment for permitting the passage of fluid around said abutment, a valve in said by-pass for controlling the passage of the fluid, and a metallic packing ring embracing the joint between said stator and said rotor for sealing the same against leakage.

41. A fluid brake mechanism embodying a stator composed of separable members held together for retaining a fluid therein and provided with a circular chamber, a driven member in said stator, an eccentric rotor fixed to said driven member and enclosed by said stator and providing a fluid chamber therearound, an abutment carried by said stator for engagement with the periphery of said rotor for closing said fluid chamber against the passage of fluid thereby, a by-pass having ports communicating with said chamber on opposite sides of said abutment for permitting the passage of fluid around said abutment, a valve in said by-pass for controlling the passage of the fluid, and a metallic packing ring embracing the joint between said stator and said rotor for sealing the same against leakage, an annular recess being formed between said stator and said rotor internally of the periphery of said rotor for receiving said ring.

42. A fluid brake mechanism embodying a stator composed of separable members held together for retaining a fluid therein and provided with a circular chamber, a driven member in said stator, an eccentric rotor fixed to said driven member and enclosed by said stator and providing a fluid chamber therearound, an abutment carried by said stator for engagement with the periphery of said rotor for closing said fluid chamber against the passage of fluid thereby, a by-pass having ports communicating with said chamber on opposite sides of said abutment for permitting the passage of fluid around said abutment, a valve in said by-pass for controlling the passage of the fluid, and a metallic packing ring embracing the joint between said stator and said rotor for sealing the same against leakage, an annular recess being formed between said stator and said rotor internally of the periphery of said rotor for receiving said ring, the area of said recess being greater than the area of said ring, whereby pressure may be applied to the periphery of said ring when said valve is operated for restricting the passage of the fluid.

43. A fluid brake mechanism embodying a stator having a bore therein, a driven member concentric with said bore, a rotor eccentrically mounted on said driven member and engaging the periphery of said bore forming a fluid chamber therearound, an abutment resiliently held on said stator and in engagement with the periphery of said rotor for closing said chamber against the passage of fluid, a by-pass around said abutment and communicating with said chamber on opposite sides of said abutment, a valve in said by-pass for controlling the passage of the fluid, concentric recesses being formed in said stator and in said rotor, and a metallic packing ring overlying the joint between said stator and said rotor and seated in said recess, for the purpose described.

44. A fluid brake mechanism embodying a stator having a bore therein, a driven member concentric with said bore, an eccentric rotor fixed to said driven member and within said bore, a radially slidable abutment carried by said stator and extensible into said bore, an oscillatable shoe carried on the inner end of said abutment and engaging the periphery of said rotor, and a spring for resiliently maintaining the shoe in engagement with said rotor.

45. A fluid brake mechanism embodying a stator having a bore therein, a separable head attached to said stator, an eccentric rotor enclosed by said stator and said head, a by-pass formed in said head and having spaced ports for affording communication with said bore, an abutment slidably mounted in said stator between said ports, a valve in said by-pass closing one of said ports, and manually operable means carried on said head for operating said valve.

46. A fluid brake mechanism for automobiles including in combination with an axle and a housing enclosing said axle, of a stator fixed to said housing and embracing a portion of said axle, a rotor fixed to said axle and enclosed by said stator, and a metallic packing ring overlying the joint between said rotor and said stator.

47. A fluid brake mechanism including in combination with an axle and a housing embracing said axle, of a fluid tight stator fixed to said housing and embracing a portion of said axle, a rotor enclosed by said stator and fixed to said axle, a fluid chamber being provided around said rotor, a by-pass in said stator having spaced ports communicating with said chamber, an abutment carried by said stator for engagement with said rotor, and a valve in said by-pass for regulating the flow of the fluid therethrough.

48. A fluid brake mechanism including in combination with an axle and a housing embracing said axle, of a fluid tight stator fixed to said housing and embracing a portion of said axle, a rotor enclosed by said stator and fixed to said axle, a fluid chamber being provided around said rotor, a by-pass in said stator having spaced ports communicating with said chamber, an abutment carried by said stator for engagement with said rotor, a valve in said by-pass for regulating the flow of the fluid therethrough, and means for operating said valve.

49. A fluid brake mechanism embodying in combination with an axle, a driven member fixed to said axle, a housing encompassing said axle, a stator fixed to said housing and encompassing a portion of said driven member, and a rotor fixed to said driven member and enclosed by said stator.

50. A fluid brake mechanism embodying in combination with an axle, a driven member fixed to said axle, a housing encompassing said axle, a stator fixed to said housing and encompassing a portion of said driven member, and a rotor fixed to said driven member and enclosed by said stator, a fluid chamber being provided in said stator and adjacent said rotor whereby a fluid held therein will be caused to freely circulate during the operation of said rotor, and means for restricting the flow of said fluid for retarding the operation of said rotor.

51. A fluid brake mechanism embodying in combination an axle, a driven member fixed to said axle, a housing encompassing said axle, a stator fixed to said housing and encompassing a portion of said driven member, and a rotor fixed to said driven member and enclosed by said stator, a fluid chamber being provided in said stator and adjacent said rotor whereby a fluid held therein will be caused to freely circulate during the operation of said rotor, means for restricting the flow of said fluid for retarding the operation of said rotor, and a metallic ring overlying the joint between said stator and said rotor for preventing the leakage of fluid from said chamber when said rotor is retarded.

LUTHER L. MACK.